United States Patent [19]

André

[11] Patent Number: 5,431,870
[45] Date of Patent: Jul. 11, 1995

[54] PROCESS FOR PRODUCING COMPOSITE MATERIAL CONNECTIONS OF LATTICE ELEMENTS

[75] Inventor: Gautier André, Rognes, France

[73] Assignee: Eurocopter France, France

[21] Appl. No.: 161,318

[22] Filed: Dec. 2, 1993

[30] Foreign Application Priority Data

Dec. 17, 1992 [FR] France ................... 92 15235

[51] Int. Cl.⁶ ............................................. B29C 70/48
[52] U.S. Cl. ................................. 264/103; 264/250; 264/257; 264/258; 264/317; 264/554
[58] Field of Search ............... 264/103, 138, 250, 255, 264/257, 258, 316, 317, 325, 328.2, 510, 511, 512, 545, 554, 571

[56] References Cited

U.S. PATENT DOCUMENTS

| | | | |
|---|---|---|---|
| 4,762,740 | 8/1988 | Johnson et al. | 264/257 |
| 4,863,771 | 9/1989 | Freeman | 264/258 |
| 4,923,724 | 5/1990 | Day et al. | 264/257 |
| 5,019,312 | 5/1991 | Bishop | 264/258 |
| 5,045,251 | 9/1991 | Johnson | 264/317 |

FOREIGN PATENT DOCUMENTS

| | | |
|---|---|---|
| 0465399 | 1/1992 | European Pat. Off. |
| 0475883 | 3/1992 | European Pat. Off. |
| 2675732 | 10/1992 | France |
| 4016042 | 11/1991 | Germany ................... 264/257 |
| 2225277 | 5/1990 | United Kingdom |
| 2254821 | 10/1992 | United Kingdom |

OTHER PUBLICATIONS

"Resin Transfer Molding for Advanced Composites", *Advanced Composites*, Debbie Stover, Mar./Apr. 1990.

*Primary Examiner*—Jay H. Woo
*Assistant Examiner*—Robert B. Davis

[57] ABSTRACT

For producing connections made from composite material for structures having at least two hollow or non-hollow bars, interconnected by at least one hollow connecting joint, separate production takes place of blanks of said different parts with the definitive shapes, but in which the impregnation resin for the assembly of said blanks has not yet been introduced, after which they are assembled by thermosetting resin transfer moulding, so as to produce the resin matrix of the connecting joint or the complete structure at the same time as the assembly. The blanks of the connecting joints are obtained by compressing a planar textile complex formed from hot preformable textile fibers between a cavity of a shaping mould and a countermould, by cutting and folding down onto the countermould the overlap parts and performing a thermal preforming cycle.

17 Claims, 4 Drawing Sheets

PROCESS FOR PRODUCING COMPOSITE MATERIAL CONNECTIONS OF LATTICE ELEMENTS

BACKGROUND OF THE INVENTION

The invention relates to a process making it possible to produce composite material connections for structures having at least two bars interconnected by at least one connecting joint, so as to form a lattice or a lattice element. The invention also relates to a lattice obtained by performing the said process.

In the present context the term "lattice" means an assembly of at least two bars interconnected by connecting junctions or joints, so as to form between the said bars one or more meshes, which can be open or closed by a skin.

In addition, the term "lattice element" means an elementary structure having two bars interconnected by a connecting joint.

The lattice-type structures obtained by performing the process according to the invention can be used in numerous industrial fields such as aviation and cars. Thus, in the aeronautical industry, it is possible to use these structures as canopy frames for cockpits or as door frames, e.g. on helicopters or certain aircraft.

In the present state of the art, there are numerous processes making it possible to produce lattice-type structures, which are both rigid and light and which can have different geometries imposed by the numerous applications to which such structures apply.

A known solution consists of using thin metal profiles or metal elements formed from stamped thin sheets assembled by welding, bonding, riveting or any other conventional process. Another known solution consists of using composite material elements obtained by thermoforming or rotomoulding, followed by the assembly thereof by bonding or welding.

Another known method consists of producing composite material elements by draping or winding and interconnecting said elements by metal connecting joints, the connection between the composite material elements and the metal connecting joints being obtained either by draping the composite materials onto the joints and at least in part on the bars, or by bonding the bars to the connecting joints. Such connections do not have a guarantee of continuity of the materials forming them over their entire path between the individual bars.

All these production processes require complex and very accurate tools in order to produce the constituent components of the final lattice-like structure, followed by further complex and very accurate tools in order to carry out the series assembly of these various components, whilst ensuring a good shape reproducibility.

Moreover, in order to comply with the requirements as regards to the rigidity of the lattice structures which it is wished to produce, it is often necessary to use local reinforcements, such as metal brackets or selective reinforcements of high strength fibre-based laminates, in order to locally increase the curvature. In the case of the third aforementioned method using draping operations, the production of such local reinforcements in non-developable structures makes it necessary to place in the latter separate textile reinforcing elements, which have to be cut, put into place and superimposed so as to provide a reinforcement corresponding to the final shape of the structure to be produced. However, the cuts which must then be made in the textile reinforcing elements introduce discontinuities in the fibres, which also leads to areas of reduced strength in the thus obtained composite material structure. For safety reasons, this is unacceptable in a certain number of applications, such as aeronautical applications. Moreover, these cutting operations take a long time and are expensive and their performance has relatively limited reproducibility and reliability characteristics.

SUMMARY OF THE INVENTION

The invention is directed at a process making it possible to produce composite material connections of structures, such as lattices or lattice elements, which are light and strong, said process not suffering from the disadvantages of the known processes and which in particular permits a simple, inexpensive and repetitive performance, whilst guaranteeing the continuity of the reinforcing fibres over the entire connection produced in this way.

According to the invention this result is obtained by means of a process for producing composite material connections formed from fibres embedded in a thermoset resin matrix for structures having at least two bars interconnected by at least one connecting joint, characterized in that it comprises the stages of producing first blanks of bars with the final shape of said bars, producing at least one second hollow connecting joint blank having the final shape of said joint, but which is not impregnated with a resin for assembling with said bars, the putting into place and compression of a planar textile complex formed from hot preformable, woven textile fibres, between a hollow cavity of a shaping mould and a countermould complimentary to said hollow cavity, turning down the overlap portions of the textile complex onto the countermould, with the interposing of a separating film between the superimposed overlap portions, so as to totally encircle the countermould without any interruption line, tightly closing the mould and performing a preforming cycle of the textile complex maintaining the integrity of the separating film, in order to obtain the second blank, demoulding said second blank and the assembly of the first and second blanks by thermosetting resin transfer moulding.

For the performance of this process, use is advantageously made as hot preformable textile fibres of high deformability fibres marketed in woven form by BROCHIER S.A. under the trade name "INJECTEX" (registered trademark). These fabrics can in particular be formed from carbon, glass or aramide fibres, or aramide/carbon or glass/carbon fibres. These fibres are characterized in that they have undergone a thermosetting, reactivatable chemical treatment which, at ambient temperature, gives the fabric a certain rigidity facilitating its handling and cutting, whilst also facilitating its assembly and shaping when heated to between approximately 80° C. and approximately 100° C. Moreover, following the preforming of the product, the treatment of the fibres again gives the fabric an adequate rigidity to permit its handling and cutting, particularly by automatic means. The treatment undergone by the fibres is also compatible with the thermosetting resin forming the matrix of composite material to be produced and is integrated into a conventional hot polymerization cycle. Finally, the preforming treatment undergone by the fibres does not modify the permeability of the fabrics, which is subsequently necessary for their impregnation by the resin for assembling the joint with the bars.

In addition, the thermosetting resin transfer moulding method used in the assembly of the first and second blanks is known under the abbreviation RIM. This moulding method, which mainly relates to materials having a thermosetting matrix, makes it possible to obtain parts having moderate to high performance characteristics. The volume ratio of the fibres can reach 60%. The principle of this process consists of the pressurized injection of the fluid resin into the textile fibres placed in a closed mould. The mould is placed in a heating press or oven, or it is equipped with a heating system permitting the baking of the resin. This process is suitable for the production of parts in moderate and small numbers in a single stage. It allows the insertion of inserts, gives the structure obtained a good surface appearance and ensures a very good reproducibility, whilst only requiring limited capital expenditure. It should be noted that the production process according to the invention makes it possible to reduce or even eliminate the conventional cutting operations during the performance of the process and can be used for producing non-developable surface reinforcements and connections and consequently no matter what shapes are given to the bars and the connection joints. Thus, the bars may be hollow or not and have a random, constant or variable section. In addition, the bars can be crooked or spiral or can have a regular shape. Moreover, the connecting joints or junctions can be hollow or not and connect two or more hollow or non-hollow bars and, as a function of the particular case, said bars can be coplanar or not.

Advantageously the planar textile complex is produced by superimposing at least two layers of hot preformable textile fibre fabrics, the fibres of one of the said layers being oriented to approximately 0° and 90° with respect to the longitudinal axis of one of the bars (generally the bar subject to the greatest tensile-compressive stress) and the fibres of the other layer are oriented to approximately +45° and −45° with respect to said longitudinal axis, so as to e.g. form a so-called quasi-isotropic material. When it is necessary to reinforce the connecting junction in a given direction, at least one series of textile fibres is positioned in said direction, between the two hot preformable fabric layers.

In a preferred embodiment of the invention, the preforming cycle incorporates a stage of heating to a temperature of approximately 100° C. under a vacuum of approximately 0.7 bar, for approximately 10 minutes, followed by a cooling stage, whilst maintaining the said vacuum.

In a first embodiment of the invention, the first blanks are produced by weaving at least three groups of textile fibres oriented in three different directions, e.g. approximately −45°, 0° and +45° with respect to the longitudinal axis of a meltable core which can be destroyed during the blank assembly stage and around which is woven the three groups of fibres. This meltable core then has externally the internal shape of the hollow bar to be produced.

In a variant of this first embodiment, the core is not meltable, but remains in place in order to ensure a stability of the coatings formed by the textile fibres.

According to a second embodiment of the invention, the first blanks are produced from another planar textile complex formed from hot preformable textile fibres, in accordance with a process identical to that making it possible to produce the second blank.

The invention also relates to a composite material lattice, characterized in that it comprises a group of bars connected by connecting joints, said lattice being produced by the aforementioned process.

When the process is used for producing lattice structures in which the bars connected by the connecting joints form meshes, whereof at least one is sealed by a skin of textile fibres embedded in a thermosetting resin matrix, simultaneous assembly takes place of the textile fibres of said skin and the first and second blanks during the thermosetting resin transfer moulding operation.

BRIEF DESCRIPTION OF THE DRAWINGS

The invention is described in greater detail hereinafter relative to a non-limitative embodiment and with reference to the attached drawings, wherein show.

DETAILED DESCRIPTION OF THE INVENTION

In an original manner, the production process according to the invention makes it possible to produce composite material connections for structures in the form of a complex lattice or lattice element. In the latter case, the structure comprises at least two bars interconnected by a connecting junction or joint. In the case of the production of a complex lattice, the structure can comprise a random number of bars interconnected by a plurality of connecting junctions or joints, so as to form between the bars meshes having a random shape, which can be coplanar or not, solid or hollow.

In order to produce such structures, separate production takes place of blanks of bars made from a composite material or not and blanks of connecting joints made from a composite material, constituting semifinished products. The blanks of the connecting joints and optionally those of the bars are formed from textile fibres brought to the desired shape, but into which the impregnation resin has not yet been introduced. When the blanks are finished, they are assembled using the known thermosetting resin transfer moulding process. Thus, simultaneous production takes place of the thermoset resin matrix of the structure and the connection of the previously produced blanks.

With regards to the blanks of composite material bars, they are preferably produced by weaving at least three groups of textile fibres oriented in three different directions, about an optionally meltable core and, in this case, which can be destroyed by heating and which have externally the internal shape of the bar to be produced. The meltable core can in particular be produced from a light, rigid honeycomb material, which has previously been shaped by any conventional machining or moulding process. The three groups of textile fibres woven onto the core can be oriented by approximately −45°, 0° and +45° with respect to the longitudinal axis of the meltable core.

According to a variant, the blanks of the bars can be produced by a process comparable with that described hereinafter for the production of the blanks of the connecting joints, using hot preformable, high deformability textile fibres placed in a shaping mould. Shaping then takes place in a single operation within the shaping mould under a slight vacuum (e.g. approximately 0.7 bars) and a moderate temperature of approximately 100° C. and for 10 minutes. Vacuum cooling then takes place of the blank prior to its demoulding.

Figure 1:
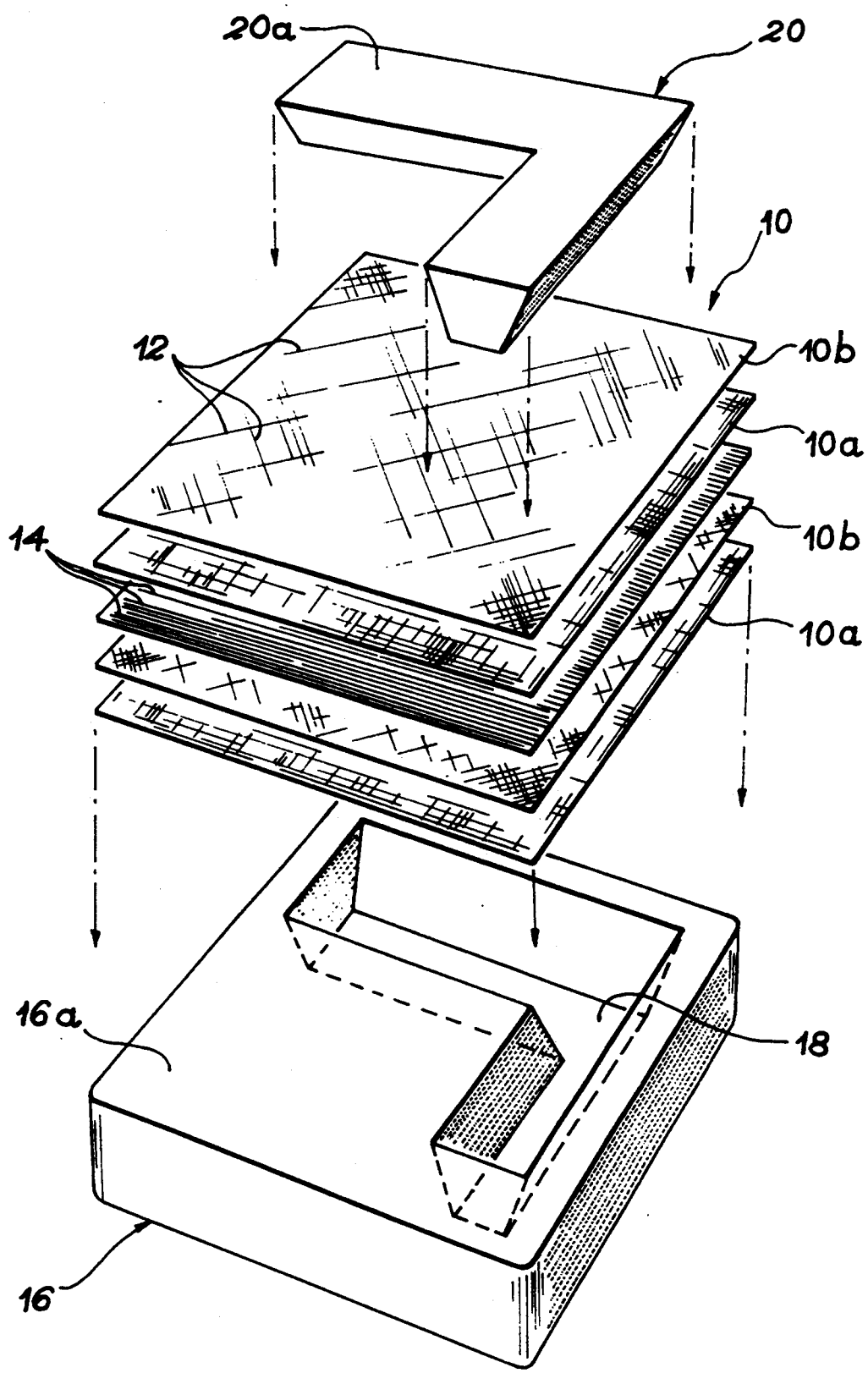
FIG. 1 An exploded perspective view showing a planar textile complex placed between the cavity of a shaping mould and a countermould, so as to illustrate one of the stages of producing a blank of a connecting joint in the production process according to the invention.
Figure 2:
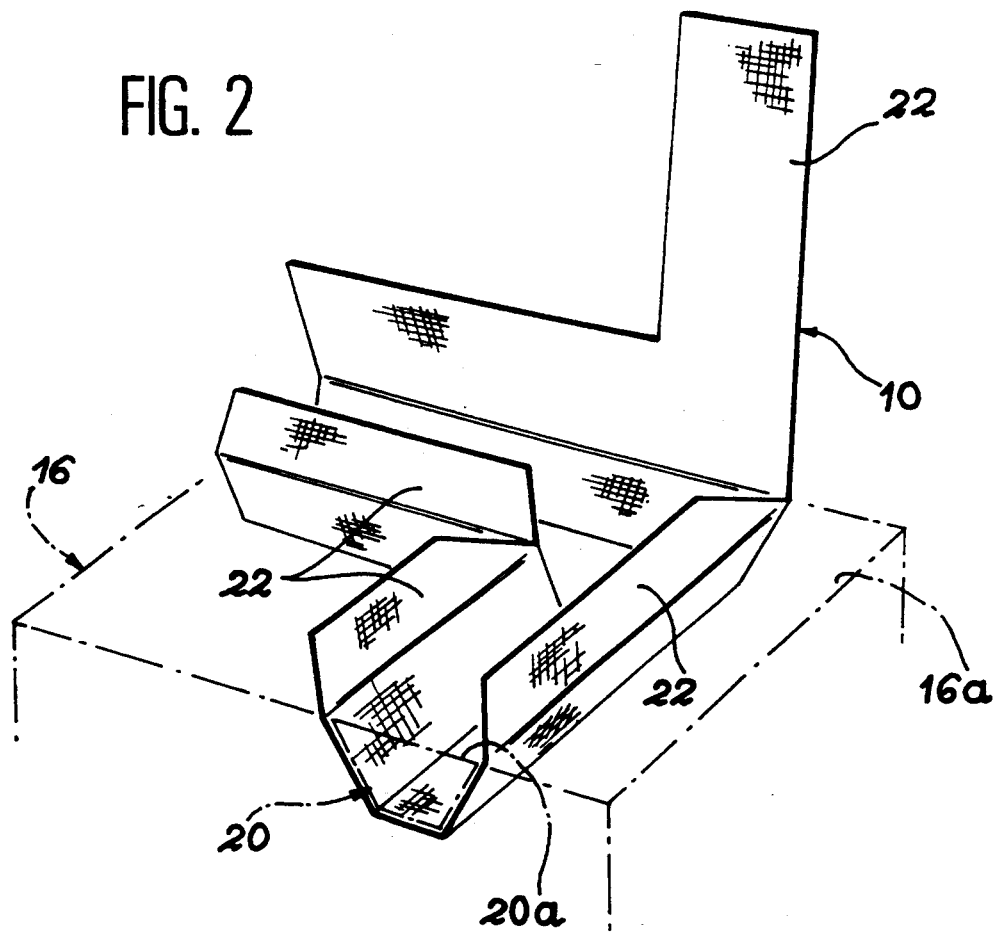
FIG. 2 A perspective view showing a subsequent stage of cutting the overlap portions of the textile complex during the production of the blank of a connecting joint.

Moreover, each of the blanks of the connecting joints is produced according to the invention using a special procedure which will now described in detail relative to FIGS. 1 and 2.

This procedure is based on the use of hot preformable, high deformability textile fibres, such as the woven fibres marketed by BROCHIER S.A. under the trade name "INJECTEX" ( registered trade mark). These fibres, which are generally in the form of a fabric, are usually carbon, glass or aramide fibres. Hybrid aramide/carbon or glass/carbon fabrics can also be used. As has already been stated, such products are characterized in that the fabrics have undergone a thermosetting, reactivatable chemical treatment, which facilitates handling and cutting, whilst also allowing preforming and assembly. In particular, the use of these very high deformability products makes it possible to very significantly reduce or even completely eliminate the local cutting operations for textiles standard for draping complex shapes. Thus, it is possible to obtain structures with a non-developable surface.

In order to produce a connecting joint blank, the first stage consists of producing a planar textile complex, like that shown at 10 in FIG. 1, using hot preformable textile fibres. Preferably, this planar textile complex 10 is formed by the superimposing of at least two fabrics 10a, 10b formed from textile fibres 12 oriented in accordance with optionally different directions. Thus, the fibres 12 of the fabric 10a can be oriented to approximately 0° and 90° with respect to the longitudinal axis of one of the bars to be connected, whilst the fibres 12 of the fabric 10b can be oriented to approximately +45° and −45° with respect to said longitudinal axis.

In the case where the planar textile complex 10 comprises more than two layers of fabrics (normally called plies), as illustrated in FIG. 1, the fabrics of type 10a and/or type 10b are stacked in accordance with a previously defined optimum order.

When the structure which it is wished to obtain has to undergo higher stresses, such as tensile stresses, in a particular direction, to the different layers constituting the planar textile complex 10 is added one or more series of parallel textile fibres 14, e.g. placed between the two layers 10a and 10b when the textile complex only has these two layers, or e.g. approximately in the centre of the stack of layers in the opposite case. The textile fibres 14 have high mechanical and/or elastic characteristics and can either be of the same nature as the fibres 12 used in the layers 10a and 10b, or of a different nature.

It is important to observe that the fibres 12 used in the planar textile complex 10 have no interruption, or break on the peripheral coating of the connecting joint. This textile complex can have in particular a substantially rectangular shape, whose dimensions are adequate to permit the production of the connecting joint blank in accordance with the process of the invention.

As is diagrammatically illustrated in FIG. 1, the planar textile complex 10 is placed on the upper face of a shaping mould 16 above a hollow cavity 18 formed in said upper face and whose non-developable shape is complimentary of the external shape of the connecting joint of the structure to be produced. In the embodiment illustrated in FIG. 1, the cavity 18 is L-shaped and its two branches have a uniform, identical isosceles trapezium-shaped section. It will be shown hereinafter that numerous other shapes can be obtained without passing outside the scope of the invention.

A countermould or moulding core 20, whose shape is complimentary of that of the cavity 18, is then placed on the textile complex 10, so as to trap the latter in the cavity 18, between the mould 16 and the countermould 20. The countermould is then strongly applied, in order to enclose the lower and lateral faces of the textile complex 10 between the mould 16 and the countermould 20, so that the textile complex 10 adopts the non-developable shape of the cavity 18 without producing folds.

During a subsequent stage of the process illustrated in FIG. 2, those portions of the textile complex 10 located above the upper faces 16a, 20a (FIG. 1) of the mould 16 and countermould 20 are then cut. This cutting makes it possible to form in the textile complex 10 overlap portions 22 able to be folded down onto the countermould 20 in order to close or seal the connecting joint to be produced. This cutting also has the effect of eliminating the surplus fabric of the textile complex over and beyond the overlap portions 22.

During the textile complex cutting operation, it is necessary to take account of the shape of the upper face 20a of the countermould 20, which can be planar in the manner illustrated in FIGS. 1 and 2, or have a more complex shape. This subsequent cutting stage can advantageously be eliminated, provided that the cuts are made in the textile complex 10 before it is placed above the hollow cavity 18 formed in the upper face of the shaping mould 16.

Figure 3:
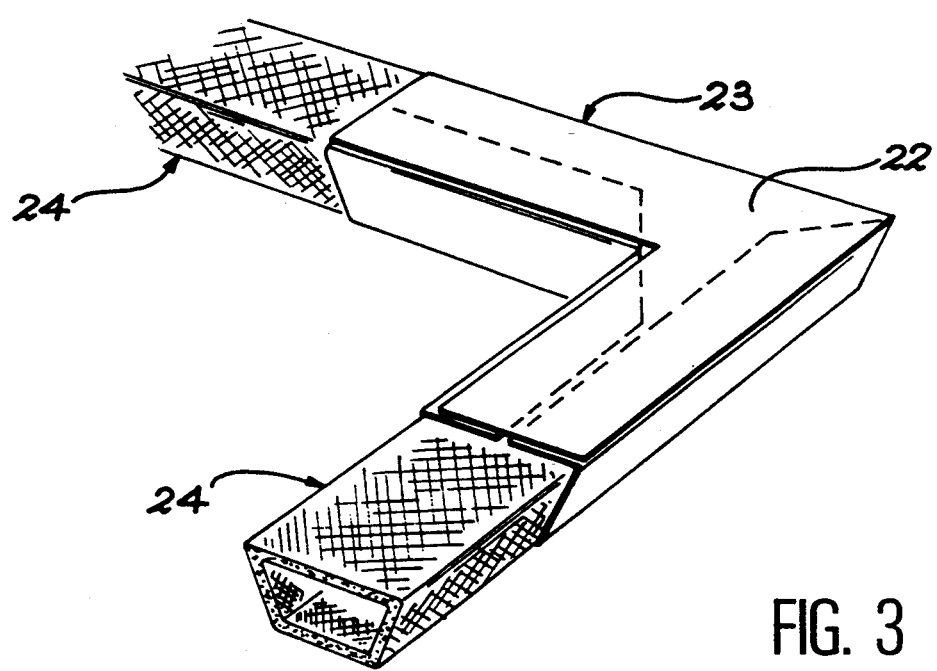
FIG. 3 A perspective view illustrating the assembly of the connecting joint blank and two bar blanks.

When the cuts exist, the different overlap portions 22 are folded down onto the visible face of the countermould 20, whilst placing between these different portions a separating film preserving its integrity until a temperature exceeding the shaping temperature has been reached. It should be noted that the overlap portion 22 turned towards the outside when all the overlap portions have been folded down in itself covers the entire visible upper face 20a of the countermould 20, as illustrated in FIG. 3.

When said final overlap portion 22 has been folded down, the mould is tightly sealed or by means of a bag, whose peripheral edges are tightly connected to the upper face of the mould 16 or to the upper face of a not shown plate supporting said mould. A vacuum circuit is connected to the tight mould or bag making it possible to establish a slight vacuum of e.g. approximately 0.7 bars throughout the textile complex preforming cycle.

To perform this preforming cycle, the tools are heated by internal means or placed in a heating press or oven and the temperature is raised to approximately 100° C. for 10 minutes. This preforming cycle makes it possible to polymerize the material contained in the fibres at the end of the chemical treatment which they have undergone during their production.

The blank is then cooled, whilst still maintaining the partial vacuum. The demoulding of the blank of the hollow connecting joint can then be carried out. This gives a blank in which the different fabric layers have been assembled with one another, except on the side of the visible upper face of the countermould 20, where adhesion or bonding has been prevented by the separating film. The blank which is then sufficiently rigid to permit its handling and possible cutting, at this time has a shape identical to that of the connecting joint of the structure which it is wished to obtain.

At this stage of production, there is on the one hand blanks of bars and on the other blanks of hollow connecting joints, all having the final shapes of the corresponding elements of the structure which it is wished to produce.

According to the invention, assembly takes place of the different blanks and the thermoset resin matrix of the structure during a single thermosetting resin transfer moulding operation. As stated, this operation uses the resin transfer moulding or RIM process.

In order to perform this operation, the blank or blanks 23 of the hollow connecting joints and the blanks of the bars 24 are placed in an injection mould having the exact shape of the structure which it is wished to obtain, whilst ensuring that there is a partial penetration of the ends of the blanks 24 of the bars into the blanks 23 of the hollow joints and there is a possible introduction into the said connecting joints of meltable or non-meltable, internal filling cores. The different blanks are then in the position diagrammatically shown in FIG. 3. It should be noted that the injection mould can be the same as the shaping mould previously used for the production of the blanks of the hollow connecting joints.

The injection mould is then sealed tightly, e.g. by means of a bag, whose edges are tightly connected to the upper face of the mould or to the upper face of a plate supporting the latter. The sealing bag is connected to a vacuum circuit making it possible to apply to the part a slight vacuum of e.g. approximately 5 mbars during resin injection.

After its sealing, the injection mould is e.g. placed in an oven and its temperature is raised to approximately 60° C. Thermosetting resin is then injected under pressure into the mould by a conventional injection system and under a pressure between approximately 1 bar and approximately 1.5 bar.

The resin used for forming the matrix of the structure to be produced is a preferably epoxy-type thermosetting resin, or can be of the bismaleide type if it is wished to give the structure obtained a self-extinguishing character.

In order to ensure the polymerization or baking of the resin, to the part is then applied a corresponding baking cycle, e.g. for an epoxy resin at a temperature of approximately 85° C. for 1 hour. The injection mould placed e.g. in an oven is then cooled to a maximum temperature of approximately 40° C. prior to the demoulding of the structure.

When the blanks of bars has been obtained by the weaving of textile fibres onto a meltable core and/or when the connecting joints have such meltable cores, the demoulding of the structure can be followed by a post-baking operation of the latter, e.g. performed in the oven at a minimum temperature of approximately 110° C. for a time between about 60 and 90 minutes. During this post-baking operation, there is a melting of the cores which are progressively destroyed and completely disappear. In order to ensure the evacuation of the meltable cores, appropriately positioned vents are made in the mould and in the moulded structure.

Figure 4A:
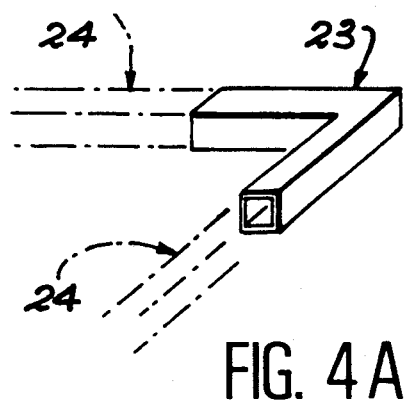
FIGS. 4A to 4G Perspective views diagrammatically illustrating different shapes of elementary composite material structures which can be produced according to the process of the invention.
Figure 4B:
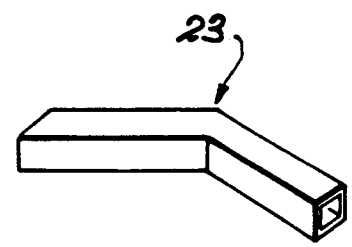
Figure 4C:
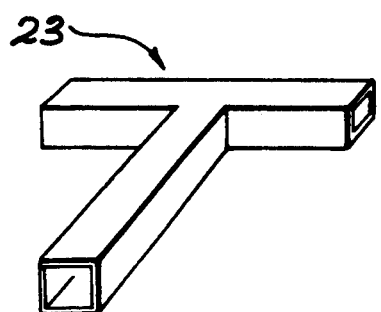

As is more particularly illustrated by FIGS. 4A to 4G, the process for the production of composite material structures described hereinbefore relative to FIGS. 1 to 3 makes it possible to produce connections for structures of the lattice type having very variable shapes. Thus, a hollow or non-hollow connecting joint of the structure can interconnect two hollow or non-hollow bars having the same section and forming between them a right angle (FIG. 4) or random angle (FIG. 4B). As is illustrated in FIG. 4C, one or more connecting joints of the structure obtained can also connect two bars of the same section in order to form a T, whose branches can, if appropriate, be oriented in accordance with an angle differing from 90°.

Figure 4D:
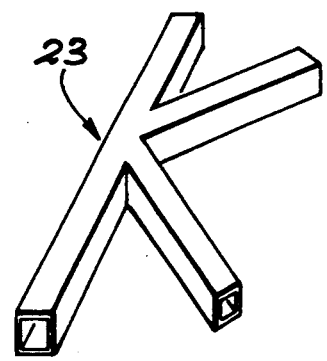
Figure 4E:
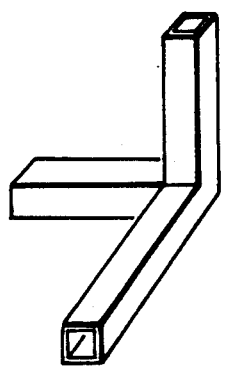

One or more connecting joints of the structure obtained can also connect a number of bars exceeding 2. These bars can then either be located in the same plane to form a K, as illustrated in FIG. 4D, or in a different plane in order to form a right-angled or non-right-angled trihedron, as illustrated in FIG. 4E.

Figure 4F:
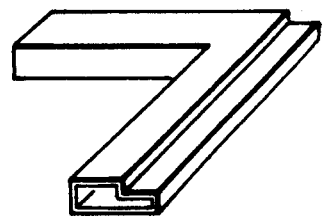
Figure 4G:
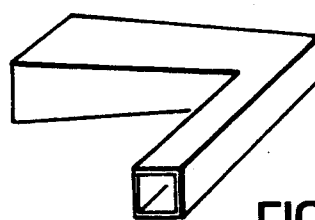

FIG. 4F shows that one or more bars connected by a connecting joint of the structure can have a cross-section different from that of the other bars. Moreover, FIG. 4G shows that one or more bars can have an evolutive section. Although not illustrated, this evolutive character can lead to a crooked and/or spiral appearance of the corresponding bars.

In general terms, the connections and bars of the structure obtained according to the invention can constitute any complex three-dimensional structure compatible with the envisaged use.

Figure 5:
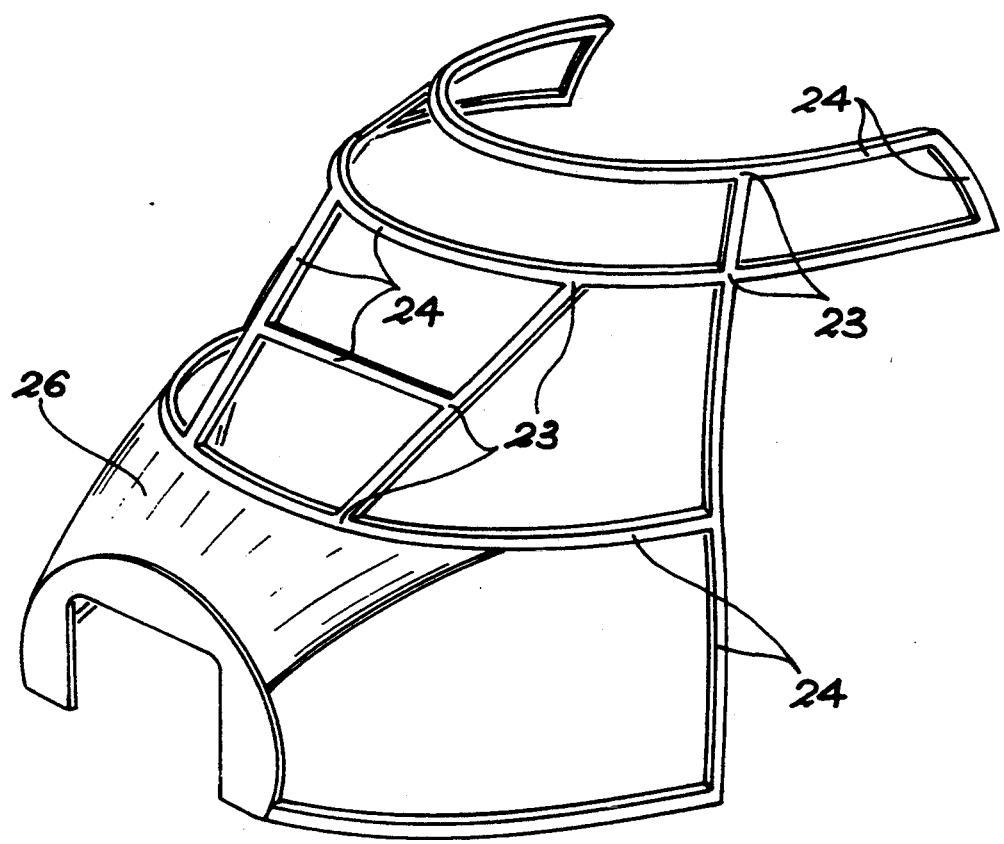
FIG. 5 A perspective view showing the canopy frame of a cockpit of a helicopter which can be produced according to the process of the invention.

FIG. 5 shows in exemplified manner a lattice-type structure, which can be produced according to the invention and which represents a helicopter canopy frame. FIG. 5 also illustrates the fact that the structure according to the invention can have a working or non-working, composite material skin 26 incorporated into the rest of the structure during the transfer moulding operation. This skin 26 seals one or more of the meshes formed between the bars 24. Its edges are placed on blanks 24 of the bars and on blanks 23 of the connecting joints prior to the sealing of the mould. When the surface of the mesh to be sealed is geometrically non-developable, said surface is preferably produced on the basis of a high deformability, preformable textile complex. The injection of the resin, followed by its polymerization then applies both to the bars, the connecting joints and the skin 26.

The process for the production of composite material structures according to the invention, such as three-dimensional lattices or lattice elements, makes it possible to simultaneously obtain a weight gain, a reduced production cost, the elimination of a certain number of assembly stages which are indispensable in existing processes, a good shape reproducibility, a good surface state and complex shapes.

I claim:

1. Process for the production of composite material connections, formed from fibres embedded in a thermoset resin matrix, for structures having at least two bars interconnected by at least one connecting joint and comprising the following steps:

(a) producing first blanks of the bars, (b) producing at least one second blank of a hollow connecting joint with the final shape of said joint, but not impregnated with a resin for the assembly with said bars, by:

(1) placing a planar textile complex formed from hot preformable woven textile fibres into a hollow cavity of a shaping mould, then compressing the planar textile complex between a countermould and the shaping mould, (2) folding down overlap portions of the textile complex onto the countermould, and interposing a separating film between the overlap portions of the textile complex, so as to completely encircle the countermould without any interruption line, (3) tight sealing of the mould and performance of a preforming cycle of the textile complex maintaining the integrity of the separating film in order to obtain the second blank, (4) demoulding said second blank, (c) assembly of the first and second blanks by thermosetting resin transfer moulding.

2. Process according to claim 1, wherein the planar textile complex is produced by superimposing at least two layers of hot preformable textile fibre fabrics, the fibres of one of these layers being oriented to approximately 0° and 90° with respect to the longitudinal axis of one of the bars, and the fibres of the other layer are oriented to approximately +45° and −45° with respect to said longitudinal axis.

3. Process according to claim 2, wherein at least one series of hot preformable, parallel textile fibres are placed between said fabric layers.

4. Process according to claim 1, wherein, prior to folding down the overlap portions of the textile complex, the latter is cut in order to eliminate surplus portions and give the overlap portions shapes appropriate to those of a visible surface of the countermould and which is to be covered by said overlap portions.

5. Process according to claim 1, wherein the preforming cycle comprises a stage of heating to a temperature of approximately 100° C., under a vacuum of approximately 0.7 bar, for a time of approximately 10 minutes, followed by a cooling stage, whilst maintaining said vacuum.

6. Process according to claim 1, wherein the first blanks are produced by weaving at least three groups of textile fibres oriented in three different directions about a core having externally an internal shape of the bar to be produced.

7. Process according to claim 6, wherein the core is meltable under the conditions of the assembly stage.

8. Process according to claim 6, wherein the three different directions are oriented at approximately −45°, 0° and +45° with respect to a longitudinal axis of the core.

9. Process according to claim 1, wherein the first blanks are produced from another planar textile complex formed from hot preformable textile fibres, by a step producing the first blanks from a process used to produce the second blank.

10. Process according to claim 7, wherein the assembly stage for the first and second blanks consists of placing these blanks in an injection mould and placing a core in each second blank, sealing the injection mould and heating it to an injection temperature, whilst creating a vacuum therein, injecting the thermosetting resin under pressure, polymerizing the resin by applying a baking cycle and demoulding the thus obtained structure after cooling the injection mould.

11. Process according to claim 10, wherein the core placed in the blanks of the connecting joints is meltable under the conditions of the assembly stage.

12. Process according to claim 10, wherein the assembly stage comprises heating the injection mould to a temperature of approximately 60° C., creating therein a vacuum of approximately 5 mbars, injecting an epoxy resin under a pressure between approximately 1 bar and approximately 1.5 bar, applying a baking cycle at a temperature of approximately 85° C. for approximately 1 hour and cooling the injection mould in an oven to a temperature of approximately 40° C. before demoulding the structure.

13. Process according to claim 11, wherein the assembly stage comprises, following the demoulding of the structure, post-baking of the structure at a melting temperature of the meltable cores in order to completely destroy the meltable cores.

14. Process according to claim 13, wherein the post-baking of the structure is performed in an oven, at a minimum temperature of approximately 110° C. and for a time between approximately 60 and 90 minutes.

15. Process according to claim 10, wherein the shaping mould is used as the injection mould.

16. Process according to claim 10, wherein a bismaleide thermosetting resin is used during the assembly stage.

17. Process according to claim 10, comprising the step of placing in the injection mould with the first and second blanks, at least one skin of textile fibres embedded in a thermoset resin matrix, in order to seal at least one mesh formed by the bars connected by the connecting joints.

* * * * *

UNITED STATES PATENT AND TRADEMARK OFFICE
CERTIFICATE OF CORRECTION

PATENT NO. : 5,431,870
DATED : July 11, 1995
INVENTOR(S) : Andre' Gautier

It is certified that error appears in the above-indentified patent and that said Letters Patent is hereby corrected as shown below:

On the Title page, under item [19], change "Andre'" to --Gautier--.

On the Title page item [75] should read as follows:

[75] Inventor: Andre' Gautier, Rognes, France

Signed and Sealed this

Twenty-first Day of May, 1996

Attest:

BRUCE LEHMAN

*Attesting Officer*      *Commissioner of Patents and Trademarks*